United States Patent [19]

Rodgers et al.

[11] Patent Number: 5,553,449
[45] Date of Patent: Sep. 10, 1996

[54] METHOD OF OPERATING A GAS TURBINE ENGINE POWERPLANT FOR AN AIRCRAFT

[75] Inventors: Joseph H. Rodgers, Vernon; Robert F. Kasprow, Wethersfield, both of Conn.

[73] Assignee: United Technologies Corporation, Hartford, Conn.

[21] Appl. No.: 171,143

[22] Filed: Dec. 21, 1993

[51] Int. Cl.$^6$ .................. F02C 7/06; F02C 7/12
[52] U.S. Cl. .................. 60/204; 60/39.08; 60/39.091; 60/39.83
[58] Field of Search .................. 60/39.07, 39.08, 60/39.091, 39.83, 736, 204, 226.1; 184/6.11

[56] References Cited

U.S. PATENT DOCUMENTS

| | | | |
|---|---|---|---|
| 4,019,320 | 4/1977 | Redinger, Jr. et al. | 60/226 R |
| 4,069,662 | 1/1978 | Redinger, Jr. et al. | 60/226 R |
| 4,351,150 | 9/1982 | Schulze | 60/226 R |
| 4,705,100 | 11/1987 | Black et al. | 60/39.83 |
| 4,773,212 | 9/1988 | Griffin et al. | 60/39.08 |
| 5,105,875 | 4/1992 | McArthur | 60/39.83 |
| 5,121,598 | 6/1992 | Butler | 60/39.08 |
| 5,127,222 | 7/1992 | Ream et al. | 60/204 |
| 5,284,012 | 2/1994 | Laborie et al. | 60/39.08 |

Primary Examiner—Louis J. Casaregola
Attorney, Agent, or Firm—Gene D. Fleischhauer

[57] ABSTRACT

A method of operating a gas turbine engine powerplant 10 for an aircraft is disclosed. Various construction details are developed which decrease the temperature of failed components to decrease maintenance time for the aircraft engine. In one particular embodiment, the method includes the step of increased cooling of the engine oil at the end of the cruise operative condition and at the beginning of idle descent to overcool oil and components in contact with the oil during the descent mode of the aircraft.

11 Claims, 3 Drawing Sheets

METHOD OF OPERATING A GAS TURBINE ENGINE POWERPLANT FOR AN AIRCRAFT

TECHNICAL FIELD

This invention relates to a method of operating a gas turbine engine powerplant and more particularly, relates to a method of operation which reduces on the wing maintenance time.

BACKGROUND ART

Powerplants for large aircraft generally include a turbofan, gas turbine engine and a nacelle for the engine. The nacelle extends circumferentially about the engine, sheltering the engine and providing aerodynamic surfaces which reduce aerodynamic drag on the powerplant as it generates thrust.

The turbofan engine includes a compression section, a combustion section, and a turbine section. A primary flowpath for working medium gases extends axially through these sections of the engine. An engine casing extends axially through the engine and circumferentially about the flowpath to bound the primary working medium flowpath.

The working medium gases of the primary flowpath are drawn into the compression section where they pass through several stages of compression, causing the temperature and pressure of the gases to rise. The gases are mixed with fuel in the combustion section and burned to form hot, pressurized gases. These gases are a source of energy to the engine and are expanded to the turbine section to produce work.

A secondary flowpath for working medium gases is disposed outwardly of the primary flowpath. The secondary flowpath is annular in shape. The engine has a plurality of fan blades which extend radially outwardly across the primary flowpath and secondary flowpath. These fan blades pressurize working medium gases entering both flowpaths of the engine.

The nacelle includes a fan nacelle and a core nacelle. The fan nacelle extends outwardly of the fan blades. The core nacelle is spaced inwardly from the fan nacelle, leaving the secondary flowpath for working medium gases therebetween. The core nacelle is spaced radially outwardly from the engine, leaving a core nacelle compartment therebetween which extends about the gas turbine engine.

The core nacelle compartment provides an enclosed shelter for components (commonly called engine accessories) which are mounted on the exterior of the engine. These accessories might include fuel lines for flowing fuel to the combustion section; an electrical generator for supplying the engine and aircraft with electrical power; a pneumatic duct for ducting a portion of the compressed gases of the engine through the nacelle and through struts to the aircraft; a second pneumatic duct for ducting compressed gases to the engine during start up from an auxiliary power unit (commonly referred to as the "APU") located in the aircraft. Other components are a hydraulic pump for providing pressurized hydraulic fluid to hydraulic vane actuators, and heat exchangers for removing heat from high-temperature fluids such as the engines lubricating fluid, fuel, and other fluids.

Cooling is provided to all of these components to keep the temperature of the components within acceptable limits. As will be realized, a primary source of heat is the engine, which employs a combustion process having temperatures which exceed twenty-five thousand (2,500° F.) degrees fahrenheit. As a result, while some portions of the accessories on the engine may have a temperature as low as two hundred (200° F.) degrees fahrenheit, other exterior portions of the engine and accessories have temperatures in excess of one thousand (1,000° F.) degrees fahrenheit. Accordingly, the nacelle compartment is ventilated during engine operation by cooling passages which flow a portion of the cool pressurized air from the secondary flowpath to the interior of the nacelle for cooling.

One example of a cooling passage is an axially extending spray bar at the top of the nacelle or at the sides of the nacelle. The spray bar flows cooling air into the upper region or side regions of the nacelle to ventilate the core nacelle compartment during operation of the engine. Another example of a cooling and ventilating system used in gas turbine engine nacelles is shown in U.S. Pat. No. 4,019,320 entitled *External Gas Turbine Cooling for Clearance Control* and U.S. Pat. No. 4,069,662 entitled *Clearance Control for Gas Turbine Engine* both issued to Redinger et al. and assigned to the assignee of this invention. In these constructions, cool air is led from the fan discharge duct and is directed externally of the engine case into a region adjacent to seals in the turbine section of the gas turbine engine. Spray bars impinge the cooling air on the engine case to control the diameter of the case and internal operating clearances on the engine which are associated with the position of the engine case. After the cool air impinges on the engine case, the air is flowed through the engine compartment to ventilate the compartment.

Another example of a cooling passage is shown in U.S. Pat. No. 4,351,150 issued to Schulze entitled *Auxiliary Air System for Gas Turbine Engine*. In Schulze, an air ducting pipe is used to duct cooling air to a component which generates heat such as an electronic engine control to cool the component. After cooling the control, the air is discharged into a compartment of the nacelle to provide ventilation to the compartment.

Another example of a cooling system for the nacelle is shown in U.S. Pat. No. 5,127,222 issued to Ream et al. entitled *Buffer Region for the Nacelle of a Gas Turbine Engine*. In Ream et al., cooling air is flowed to a buffer region in the nacelle after engine shutdown. The cooling air surrounds the component after engine shutdown to avoid transfer of the heat from hot gases on the interior of the compartment to the component to keep the temperature of the hydraulic fluid within acceptable limits.

There is a second problem caused by the generation of heat by the engine during operation. Failure of a component requires that the component be replaced on the wing and in a short period of time. This is particularly a problem if the component is a dispatch critical item. After a dispatch critical item fails during the flight of the aircraft, the dispatch critical item must be repaired or replaced before the aircraft is permitted to continue with its regularly scheduled service. This is true even though a back-up system even though the back-up sensing system is functioning perfectly, the aircraft cannot take off until the primary sensing system is repaired (for example, main oil pressure sensing system is functioning perfectly).

Thus, the dispatch critical item must be repaired or replaced prior to departure of the aircraft which normally takes place in one to two hours. Items such as electrical connectors, pressure diaphragm sensors, components such as hydraulic actuators, electrical generators, heat exchangers are designed to be replaceable within thirty (30) minutes to ensure the aircraft meets its scheduled departure time. For example, parts are not layered to promote access to the parts and to provide spacing between the parts so that easy access is provided. Back-up wires have been eliminated from conduits carrying air to speed replacement of these components by engine maintenance personnel. Hinge clamps are employed in many locations and other designs of attaching devices to the engine are to decrease the time to remove and replace these components.

Engine maintenance personnel are provided with protective clothing, including gloves to shield them from hot components during removal and replacement of a malfunctioning component. As a result of these protective devices, the maintenance personnel are able to work on even the hottest components as soon as the components cool down to a temperature at which the protective clothing is effective.

The above art, notwithstanding, scientists and engineers working under the direction of applicant's assignee have sought to reduce the amount of time required to remove and replace components on the exterior of the engine to ensure that turn time for the repair of such components is less than one to two hours to ensure that the aircraft can meet is scheduled departure time.

DISCLOSURE OF INVENTION

This invention is in part predicated on realizing that cooling the interior of a nacelle compartment so that the temperature of the interior is lower than normal during the flight of the aircraft, will speed maintenance time and reduce the number of flight cancellations because of missed departure times; but, that over cooling the interior will cause a penalty in performance to the aircraft.

According to the present invention, a method of operating a gas turbine engine powerplant having a component which has failed during flight operation includes the steps of detecting the failure and providing additional cooling to the engine during the descent portion of the flight to decrease the amount of cool-down time before airline maintenance personnel are able to work on the failed component.

In accordance with one detailed embodiment of the present invention, the method includes providing increased oil cooling at the end of cruise and the beginning of the idle descent, operative condition of the engine and providing increased nacelle ventilation air at the beginning of the idle decent operative mode of the aircraft.

In accordance with one detailed embodiment of the present invention, the method of operating the aircraft further includes the steps of shutting down the engine having a failed component during the taxi operative condition and windmilling the engine to provide increased cooling after landing and during the deplaning operative conditions, then halting the windmilling and using cooling air provided by the auxiliary power unit or another unit independent of the engine to cool certain components of the engine.

A primary feature of the present invention is the detection of a failure mode of a component and initiating an additional cooling period prior to landing of the aircraft. Another feature of the present invention is the step of providing additional cooling during the descent operative mode of the aircraft to the lubricating oil of the engine and, at the same time, providing increased nacelle ventilation followed by windmilling the engine during the taxiing condition to force cooling air through the interior of the engine through the nacelle compartment to increase cooling. In accordance with one detailed embodiment of the present invention, our primary feature is diverting a portion of the cooling air for the interior of the aircraft to the engine to provide increased cooling to engine components.

A primary advantage of the present invention is the turn time required to repair or replace a failed component which results from over cooling the interior of the engine during the descent of the aircraft and landing to lower the temperature of the interior of the engine. Another advantage of the present invention is the increased speed at which aircraft engine maintenance personnel are able to work because of the elimination of protective clothing for some maintenance procedures on the engine. Another advantage is the reduced levels of injury to aircraft maintenance personnel which results from decreasing the temperature of the components to which the aircraft engine maintenance personnel are exposed.

The foregoing features and advantages of the present invention will become more apparent in light of the following detailed description of the best mode of carrying out the invention and in the accompanying drawings.

BEST MODE FOR CARRYING OUT THE INVENTION

Figure 1:
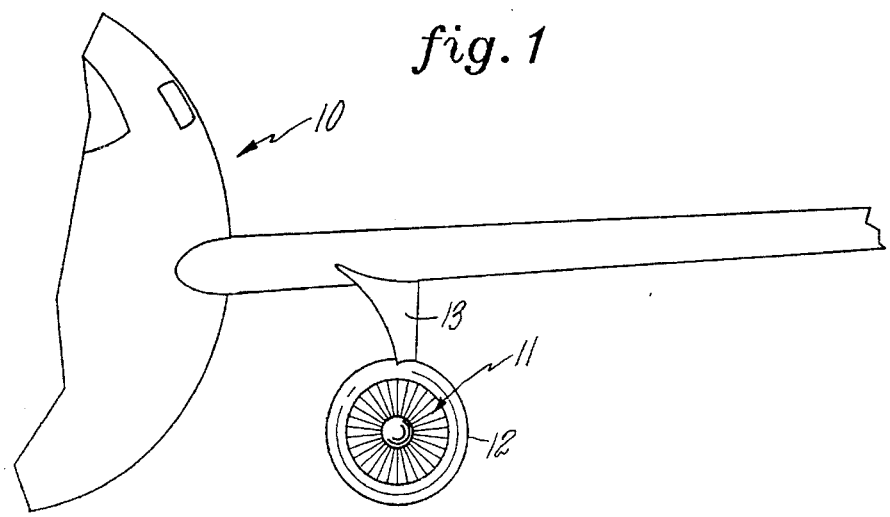
FIG. 1 is a front view of an aircraft having a turbofan gas turbine engine.
Figure 2:
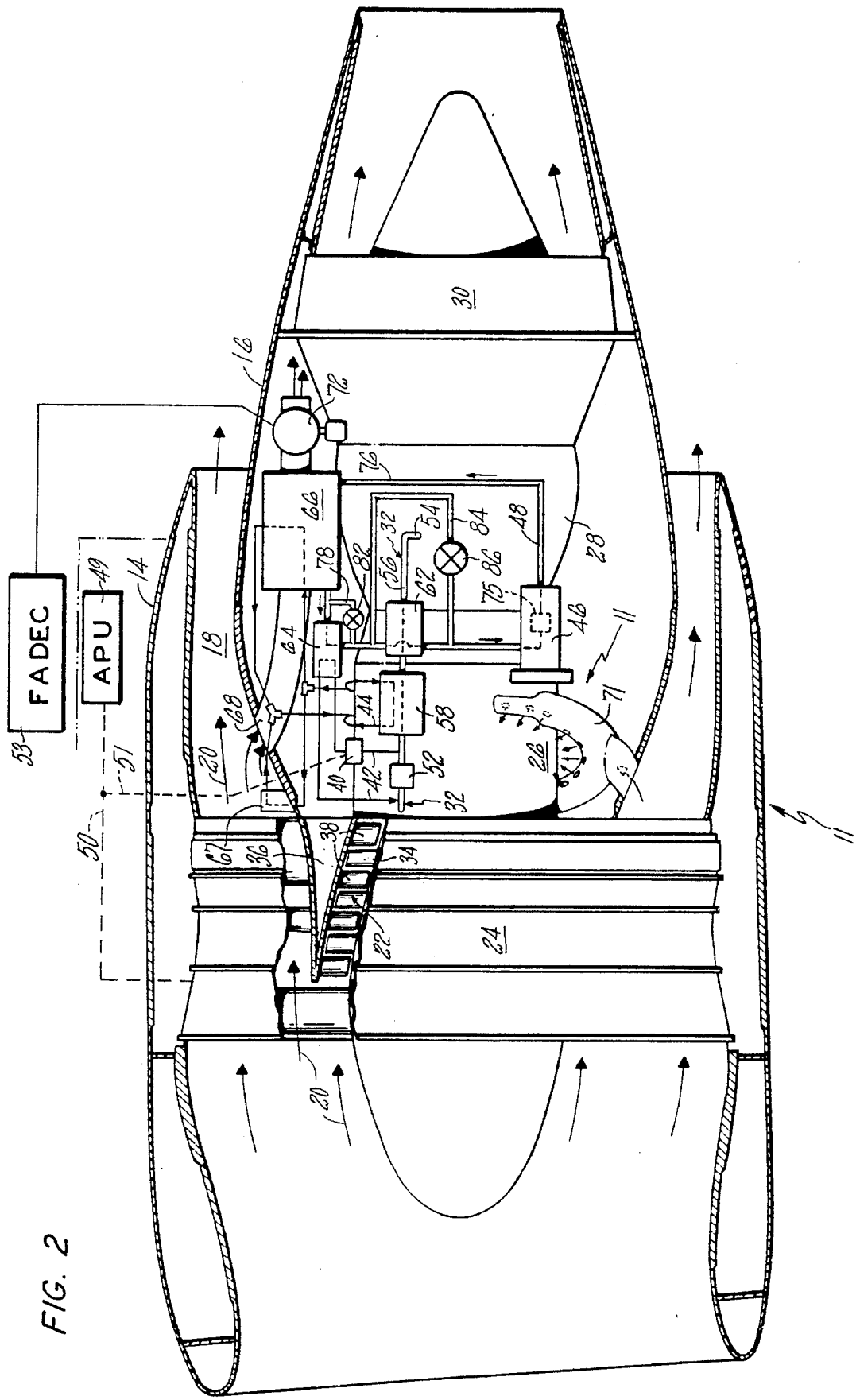
FIG. 2 is a view from above of a powerplant for a gas turbine engine with portions of the nacelle broken away to show a high bypass turbine fan engine and a schematic representation of electronic engine control for the engine other components of the engine and a cooling system for such components and associated aircraft components, such as an auxiliary power unit.
Figure 4:
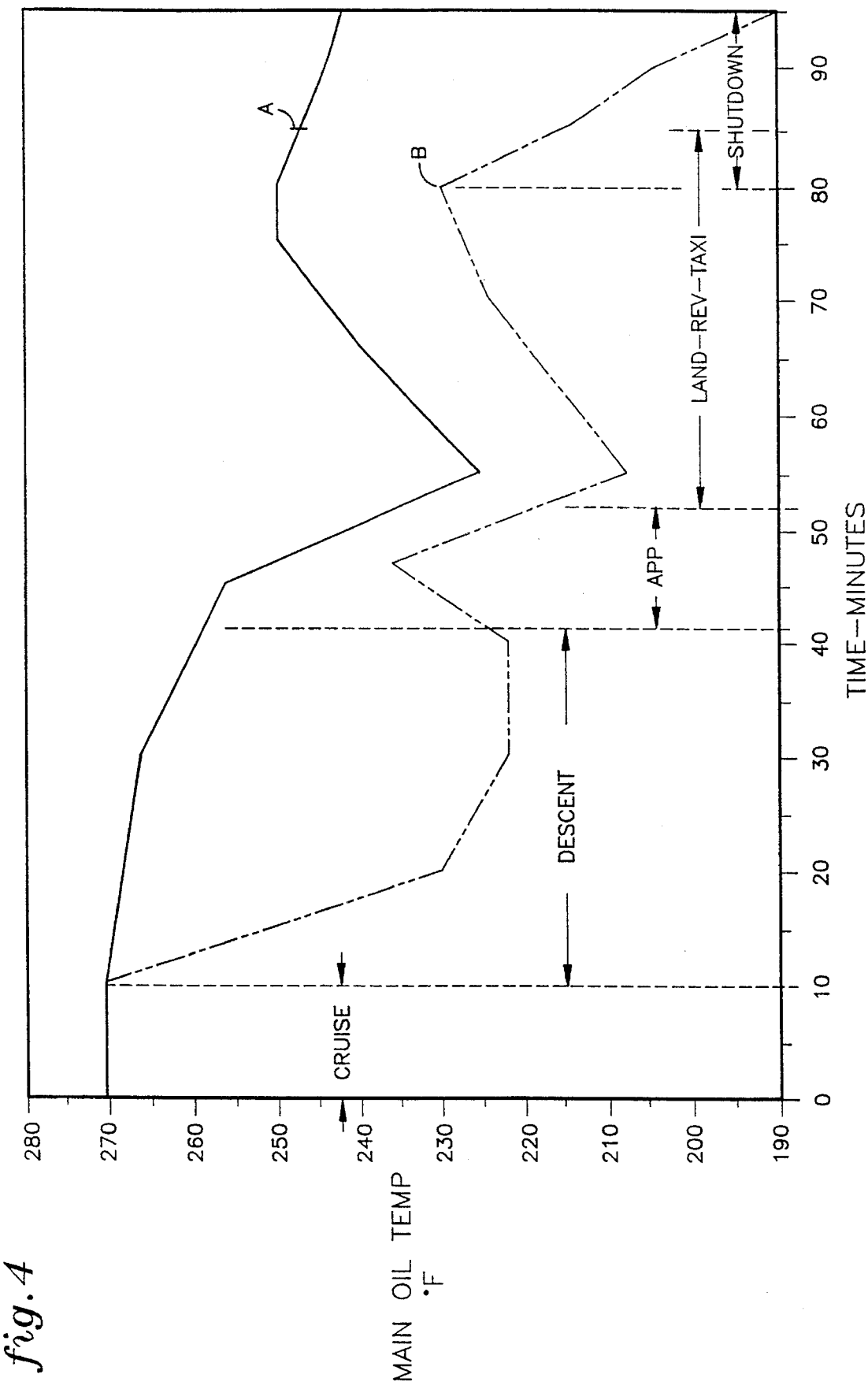
FIG. 4 is a graphical representation of the temperature of the engine oil (which is representative of the nacelle compartment temperature) as a function of time during different operative modes of the engine with and without various increased cooling systems.

An aircraft 10 having a gas turbine engine 11 of the axial flow, turbo-fan type is shown in FIG. 1. A nacelle 12 circumscribes the engine. The nacelle is adapted to both support and position the engine from a support structure such as an aircraft wing and pylon 13. As shown in FIG. 2, the nacelle includes compartments for housing auxiliary equipment such as a nacelle fan compartment 14 and a nacelle core compartment 16.

As shown diagrammatically in FIG. 2, the core compartment 16 is spaced radially inwardly of the nacelle fan compartment 14, leaving a fan bypass duct 18 therebetween. A secondary flowpath 20 for working medium gases extends through the bypass duct. A primary flowpath 22 for working medium gases extends rearwardly through the engine. The engine includes a fan section 24, a compressor section 26, a combustion section 28, and a turbine section 30. A fuel supply system 32 is in fluid communication with the combustion section.

The fan section and the compressor section together are commonly referred to as the compression section. The compression section and the turbine section include rotor components 34 and stator components 36. The stator components include variable stator vanes 38 which extend across the primary flowpath 22 for working medium gases. A hydraulic vane controller 40 for positioning the vanes is linked to the vanes. A fuel recirculation system 42 for providing hydraulic power is in fluid communication with the hydraulic vane controller such that the hydraulic vane controller develops a hydraulic force in response to pressurized fuel. An engine oil system 44 is provided for lubricating components such as bearings which support the rotor components.

A component which produces excess heat, such as an electrical generator 46 for supplying electric power to the aircraft at a constant frequency, is also housed in the core compartment 16. The electrical generator is driven by the gas turbine engine. A cooling system 48 for the electrical generator is in fluid communication with the generator.

An auxiliary power unit 49 on the aircraft 10 provides air conditioning air to the aircraft, stator air via a pneumatic duct 50 to the engine, and cool air to engine components via duct 51 under certain operative conditions of the engine.

Figure 3:
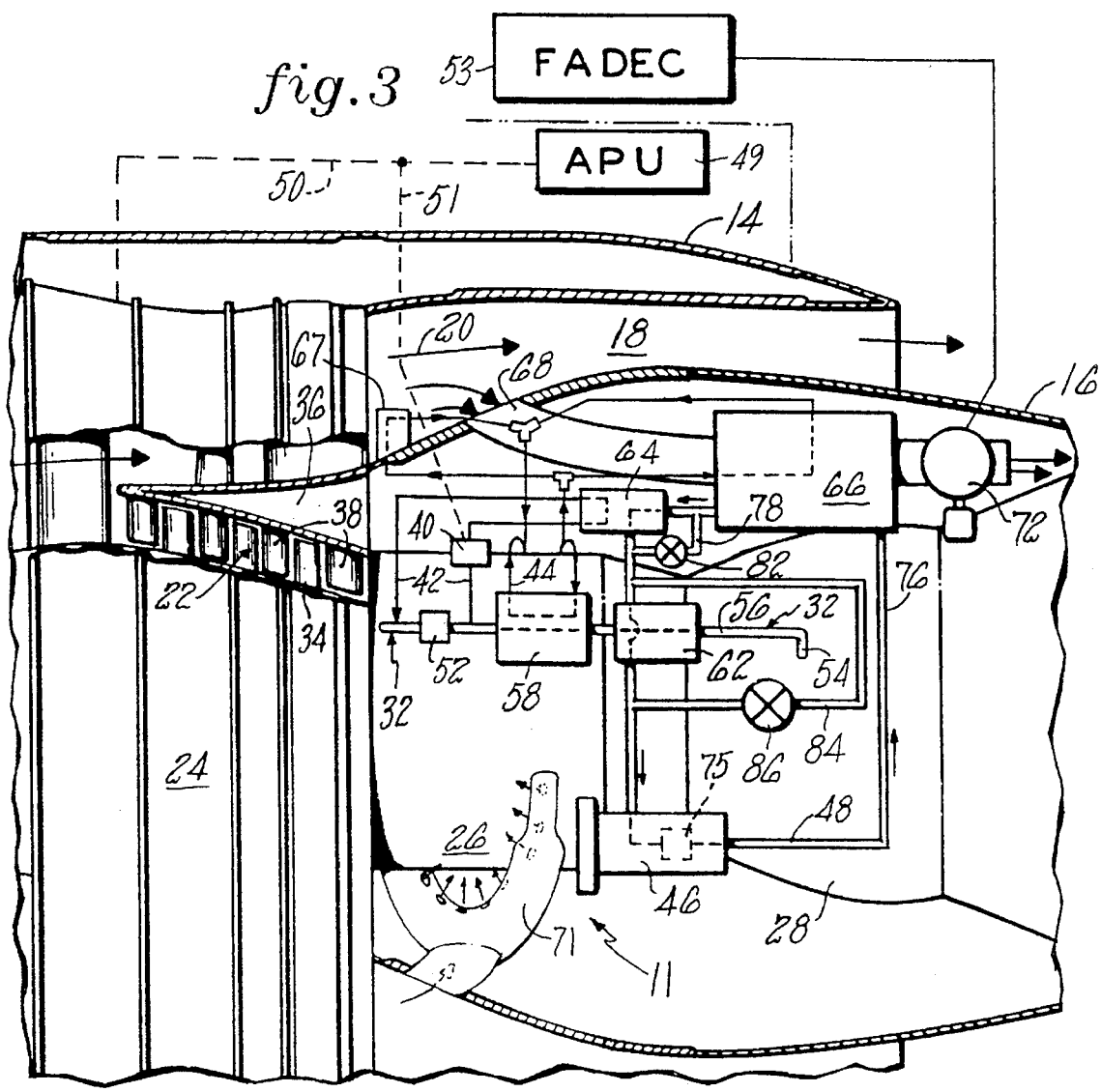
FIG. 3 is a diagrammatic view of a portion of the gas turbine engine shown in FIG. 2.

FIG. 3 shows in greater detail, the cooling system 48, the fuel recirculation system 42 and the fuel supply system 32. The fuel supply system includes a fuel tank (not shown) typically disposed in the wing of the aircraft, a main fuel pump (not shown) and a fuel control 52. The fuel control is responsive to the fuel authority digital electronic engine control (FADEC) 53. This particular engine control is the model EEC-170 electronic engine control manufactured by the Hamilton Standard Division of the assignee. A fuel nozzle 54 provides means for injecting fuel into the combustion chamber of the engine. A fuel line 56 for ducting fuel extends from the tanks through the main fuel pump and fuel control to the fuel nozzle.

The fuel supply system 32 includes means, such as a first heat exchanger 58, for transferring heat from the engine oil to the fuel. Second means, such as the second heat exchanger 62, is provided for transferring heat between the fuel in the fuel line and cooling fluid in the cooling system 48 for the electrical generator.

The fuel recirculation system 42 includes means, such as a third heat exchanger 64, for transferring heat from the cooling fluid in the cooling system 48 to the fuel in the fuel recirculation system.

The cooling system 48 for the electrical generator 46 includes means, such as a fourth heat exchanger 66, for transferring heat from the cooling fluid for the electrical generator to the cooling air. In addition, oil of the engine oil system 44 is flowed to the fourth heat exchanger 66 and to a fifth heat exchanger 67 in the flowpath 20 to provide additional cooling to the engine oil system under selected operative conditions of the engine. A conduit 68 extends between the fan duct 18 and the fourth heat exchanger 66 to place the fourth heat exchanger in fluid communication with a source of cooling air. The cooling air is discharged from the heat exchanger 66 and exhausted into a nacelle compartment such as the nacelle core compartment 16. A spray bar 71 also distributes cooling air to nacelle compartment 16. A valve 72 for regulating the fan air flow through the conduit 68 and a valve (not shown) in spray bar 71 are responsive to the temperature of the compartment and of the cooling fluid in the cooling system 48 at the point of discharge from the electrical generator. These valves are also responsive to the full authority digital electronic control (FADEC) 53 for the engine. For example, the FADEC control might be means responsive to temperature, pressure, or of other limits which indicate a failure in the systems of the engine to provide additional cooling to components in a particular system after such a failure.

Means 75 for circulating the cooling fluid in the cooling system 48 includes a pump (shown in dotted) and a conduit as represented by the conduit 76. As will be realized, the pump might be an integral portion of the electrical generator. The means 75 is used to place the cooling fluid in fluid and heat transfer communication with the electrical generator, the fourth heat exchanger 66, the third heat exchanger 64, and the second heat exchanger 62. This means 75 for circulating the cooling fluid includes a bypass conduit 78 which connects the inlet and outlet of the third heat exchanger to prevent the transfer of excessive amount of heat to the fuel. A valve 82 responsive to the temperature of the fuel in the fuel circulation system 42 or to the FADEC, is used to regulate the flow of cooling fluid through the third heat exchanger. A second bypass conduit 84 connects the inlet and discharge ports of the second heat exchanger to prevent the loss of heat from the cooling fluid during low temperatures as far as start up of the engine. A valve 86 is responsive to the temperature of the cooling fluid in the cooling system and to the FADEC to regulate the flow of cooling fluid through the bypass conduit around the second heat exchanger.

During operation of the gas turbine engine, working medium gases in the form of air are drawn into the gas turbine engine 11. These gases are compressed in the compressor section 26, causing the temperature and the pressure of the working medium gases to increase. The gases are flowed to the combustion section. Fuel from the fuel tank is injected by the fuel nozzle 54. The fuel and gases are mixed and burned to add energy by increasing the temperature of the working medium gases. The hot, working medium gases are expanded through the turbine section 30 to power the aircraft to which the engine is attached.

Moving components of the engine are lubricated by engine oil flowed to the components through the engine oil system 44. This causes heating of the engine oil. The heat is transferred from the engine oil to fuel flowed through the fuel supply system 32 to the fuel nozzles 54. An additional amount of heat is also flowed via the third heat exchanger 66 to gases passing through the interior of the engine via conduit 68. Heat produced by the electrical generator 46 is also transferred to the cooling air which is flowed through the cooling system 48 and thence to the heat exchanger 66.

The withdrawal of cooling air from the secondary flowpath 20 for cooling of fluids in heat exchanger 66 and for ventilating the nacelle core compartment removes a portion of the flow which develops thrust for the aircraft. Accordingly, only that level of cooling is provided which is required for sensible operation of the components within acceptable temperature limits.

For example, at high power operations, a large amount of heat per unit time is generated by engine components which are cooled by the lubricating oil flowing through the engine through the engine oil system 44. A sudden reduction in power, such as a decrease in power from cruise to flight idle or descent idle, reduces the fuel flow through the first and second heat exchangers 58, 62. For a short period of time this large amount of heat is removed through the first heat exchanger 58, with reduced fuel flow. Heat is then transferred via the second heat exchanger 62 to the cooling flow through the cooling system of the electrical generator. Heat is also transferred from the engine directly to the heat exchanger 66 or to other heat exchangers disposed in fluid communication with the engine oil such as the fifth heat exchanger 67. Once the heat transfer levels are balanced, the amount of cooling air flowed through the conduit 68 is decreased or eliminated.

FIG. 3 is a graphical representation of the temperature of the engine oil. The temperature of the oil flowed through the engine is the temperature seen by the heat exchangers and other components in contact with the oil. The temperature of the oil is also a relative indicator of the temperature of the nacelle component and other components as a function of time under different operative modes of the engine such as cruise, descent, approach, and landing. It includes operations on the ground such as reverse operation of the fan for stopping the aircraft and taxiing the aircraft to a location at shutdown where passengers and freight are deplaned. Engine shutdown occurs for the engine at point A for normal operation and may occur at point B if a dispatch critical item fails.

In the event of normal operation (with normal levels of cooling for each operative condition of the engine), the oil temperature will follow the solid line shown in FIG. 3 for one typical installation of an aircraft engine. Except for the transient temperature condition at the transition from cruise to descent (not shown), oil temperature decreases during the descent period and through approach until reverse operation of the engine at high power is used to stop the aircraft. Oil temperature again rises and begins to drop during taxiing and once engine shutdown occurs, as shown by point A.

The phantom line represents the cooling which takes place after a dispatch critical item fails during flight of the aircraft. As a result of the failure operative mode of the component, the FADEC control provides an additional level of cooling beyond that provided during normal operative conditions. For example, more heat is rejected from the oil to the fourth heat exchanger 66 by flowing additional amounts of oil to heat exchanger 67 or by flowing additional amounts of air through the fourth heat exchanger by opening valve 72. As a result, the temperature of the oil decreases significantly in comparison to normal operative cooling. In addition, additional nacelle ventilation air might be provided to the nacelle to further cool components in the nacelle depending on the type of component which has failed. This would further decrease the main oil temperature below the dotted line shown in FIG. 3. This air might be supplied through the independent duct 71 (spray bar) or through the conduit 68, by passing through the heat exchanger 66.

Increased power required for the approach to the landing field increases the temperature of the oil. As the aircraft touches down and begins landing, the temperature again decreases. The temperature of the oil again increases as a result of fan reversal operation at a fairly high power to stop the aircraft. The temperature of the oil remains less than the temperature of the oil under normal operative conditions because of over cooling of the engine oil and the compartment 16 during the descent operative condition.

As the aircraft is taxied to the deplaning location, the engine with the failed component might be used to produce a portion of the taxi power. In the example shown, the engine is shut off (point B) at approximately 80 minutes, and before the taxi operation is concluded. Starter air is ducted via conduit 50 from the auxiliary power unit 49 as in the normal start mode to the starter motor (not shown) and through gearing systems (not shown) to drive the high pressure rotor about the axis of rotation (windmilling).

As the engine is windmilled using the starter air provided by the APU to windmill the engine, additional cooling air is pumped through the interior of the engine, through the nacelle compartments and through the heat exchangers in flow communication with the oil. This causes a further significant decrease in the temperature of the engine and of the engine oil, thus cooling any components in contact with the oil. In addition, the ventilation air and the flow through the engine decreases the temperature of components not in flow communication with the oil by reason of cooling the interior of the nacelle.

The APU 49 might also be used to supply cool air conditioning air from the APU to preselected components, as represented by the duct 51 supplying air to the vane controller 40. Alternatively cool air might be supplied on the ground from a special cooling device, such as a portable air conditioning device powered by electrical power external to the aircraft.

As a result of the cooling during descent, a significant decrease of the temperature of components in contact with the oil and with other components occurs in comparison with constructions in which this additional cooling is not provided upon detection of a failure operative mode of a component, whether with oil cooling alone or in combination with the other cooling during repair or replacement of a component.

Aircraft engine maintenance personnel are able to work on the components earlier than normal because the components reach acceptable levels of temperature sooner. This reduces the amount of time required to replace a failed part in comparison with constructions which do not provide additional cooling to the interior of the nacelle or to the oil. Another benefit is the safety and comfort of aircraft maintenance personnel who are not subjected to as high temperature components in those situations when the personnel must work with such components in order to meet the next scheduled departure of the aircraft. Another advantage is the facility and ease with which maintenance personnel can handle the components in those cases where cooling has occurred to such an extent that the need for protective clothing and protective gloves is eliminated.

Although the invention has been shown and described with respect to detailed embodiments thereof, it should be understood by those skilled in the art that various changes in form and detail thereof may be made without departing from the spirit and scope of the claimed invention.

We claim:

1. A method of operating a powerplant for powering an aircraft, the powerplant including a turbofan gas turbine engine including a lubricating system for the engine having a lubricating fluid and having a cooling system for the lubricating fluid, the powerplant further including 1) a nacelle which extends circumferentially about the engine and which is spaced from the engine leaving a core compartment therebetween, and 2) a source of cooling air external of the core compartment which is in flow communication with the cooling system for the lubricating fluid, the aircraft further having several operative conditions, each operative condition having a first level of cooling for the core compartment and the lubricating fluid which is associated with normal operation, the normal operative conditions including a cruise operative condition, a descent operative condition, a landing operative condition, a fan reverser operative condition, a taxi operative condition and a deplaning operative condition, the engine having a component having a failure operative mode and having means for sensing the failure operative mode of the component and which controls the level of cooling for the lubricating fluid, comprising the steps of:

detecting a failure operative mode of a component by sensing a failure signal from the component with the means for sensing the failure operative mode of the component; and, providing a second amount of cooling to the lubricating fluid which is greater than the amount of cooling to achieve the normal first level of cooling during at least a portion of the descent operative condition of the aircraft;

wherein the additional cooling provided reduces the temperature of the interior of the core compartment and the component having the failure operative mode to provide access to and replacement of the component earlier than if only the first level of cooling were provided at the operative conditions of the engine.

2. The method of operating the powerplant for powering an aircraft of claim 1 wherein the step of providing a second amount of cooling includes the step of flowing a second amount of cooling air from a location exterior to the core compartment which is greater than the amount of cooling air required to achieve the normal first level of cooling at the descent operative condition of the engine and including the step of flowing the cooling air to the cooling system for the lubricating fluid.

3. The method of operating the powerplant for powering an aircraft of claim 2 wherein the powerplant includes a cooling system for ventilating the core compartment and wherein the step of flowing a second amount of cooling air to the core compartment includes flowing cooling air to the cooling system for the core compartment to ventilate the core compartment.

4. The method of operating the powerplant for powering an aircraft of claim 3, the powerplant including a spray bar disposed in the core compartment in flow communication with the source of cooling air and wherein the step of flowing an additional amount of cooling air to the core compartment includes the step of flowing cooling air through the spray bar.

5. The method of operating the powerplant for powering an aircraft of claim 1, the aircraft having an auxiliary power unit for generating cool air and for supplying pressurized starter air to windmill the engine, which includes the step of shutting down the engine during the taxi operative condition of the engine and flowing starter air from the auxiliary power unit to the engine and windmilling the engine to provide additional cooling air to the cooling system for the lubricating fluid.

6. The method of operating the powerplant for powering an aircraft of claim 1, wherein the aircraft has an auxiliary power unit for generating cool air, which includes the step of shutting down the engine during the deplaning operative condition of the engine and flowing cooling air from the auxiliary power unit to the core compartment such that the auxiliary power unit is in flow communication with the core compartment to provide additional cooling to the core compartment from the auxiliary power unit.

7. The method of operating the powerplant for powering an aircraft of claim 1, wherein the aircraft has a device exterior to the core compartment for producing cooling air which is in flow communication with the core compartment, the method including the step of shutting down the engine during the deplaning operative condition of the engine and flowing cooling air from the device during the deplaning operative condition of the engine to the core compartment.

8. A method of operating a powerplant for powering an aircraft, the powerplant including a turbofan gas turbine engine including a lubricating system for the engine having a lubricating fluid and having a cooling system for the lubricating fluid, the powerplant further including 1) a nacelle which extends circumferentially about the engine and which is spaced from the engine leaving a core compartment therebetween, 2) a cooling system for the core compartment, and 3) a source of cooling air on the exterior of the core compartment which is in flow communication with the cooling system for the core compartment and the cooling system for the lubricating fluid, the aircraft having an auxiliary power unit for generating cool air and for supplying pressurized air to windmill the engine, the aircraft further having several operative conditions, each operative condition having a first level of cooling for the core compartment and the lubricating fluid which are associated with normal operation, the normal operative conditions including a cruise operative condition, a descent operative condition, a landing operative condition, a fan reverser operative condition, a taxi operative condition and a deplaning operative condition, the engine having a component having a failure operative mode and having a full authority digital electronic control which senses the failure operative mode of the component and which controls the levels of cooling for the core compartment and for the lubricating fluid, comprising the steps of:

detecting a failure operative mode of a component by sensing a failure signal from the component with the electronic control for the engine;

flowing a second amount of cooling air from a location exterior to the core compartment which is greater than the amount of cooling air required to achieve the normal first level of cooling at that operative condition of the engine including the steps of flowing the cooling air to the cooling system for the lubricating fluid and the cooling system for the nacelle compartment during the descent, landing,approach, and fan reverser operative conditions of the engine;

shutting down the engine during the taxi operative condition of the engine and flowing starter air from the auxiliary power unit to the engine and windmilling the engine to provide additional cooling air to the cooling system for the lubricating fluid and the cooling system for the nacelle compartment; and, flowing cooling air external of the core compartment to the core compartment during the deplaning operative condition of the engine;

wherein the additional cooling provided reduces the temperature of the interior of the core compartment and the component having the failure operative mode to provide access to the component earlier than if only the first level of cooling were provided at the operative conditions of the engine.

9. The method of operating the powerplant for powering an aircraft of claim 8, the powerplant including a spray bar disposed in the core compartment in flow communication with the source of cooling air and wherein the step of flowing an additional amount of cooling air to the core compartment includes the step of flowing cooling air through the spray bar.

10. The method of operating the powerplant for powering an aircraft of claim 8, wherein the cooling air of the auxiliary power unit is in flow communication with the core compartment, and wherein the step of flowing cooling air external of the core compartment to the core compartment during the deplaning operative condition of the engine includes flowing cooling air to the core compartment form the auxiliary power unit.

11. The method of operating the powerplant for powering an aircraft of claim 8, wherein a device exterior to the core compartment for producing cooling air is in flow communication with the core compartment, and wherein the step of flowing cooling air external of the core compartment to the core compartment during the deplaning operative condition of the engine includes flowing cooling air to the core compartment from said device.

* * * * *